(12) United States Patent
El-Wakeel et al.

(10) Patent No.: US 10,293,735 B2
(45) Date of Patent: May 21, 2019

(54) EXPANDABLE STRUCTURE AND VENDOR SPACE

(71) Applicant: Imam Abdulrahman Bin Faisal University, Dammam (SA)

(72) Inventors: Hala El-Wakeel, Dammam (SA); Fatima Al Doukhi, Dammam (SA); Haya Alfaraj, Dammam (SA); Semah Alabduljabbar, Dammam (SA); Haifa Alarifi, Dammam (SA); Sumayyah Alshraim, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

(21) Appl. No.: 15/815,038

(22) Filed: Nov. 16, 2017

(65) Prior Publication Data
US 2018/0274256 A1 Sep. 27, 2018

Related U.S. Application Data

(60) Provisional application No. 62/474,144, filed on Mar. 21, 2017.

(51) Int. Cl.
*B60P 3/025* (2006.01)
*E04H 1/12* (2006.01)
(Continued)

(52) U.S. Cl.
CPC ............ *B60P 3/0257* (2013.01); *A47F 5/108* (2013.01); *A47F 9/00* (2013.01); *A47F 10/00* (2013.01);
(Continued)

(58) Field of Classification Search
CPC ..... E04H 15/32; E04H 1/1222; E04H 1/1255; E04H 1/1272
See application file for complete search history.

(56) References Cited

U.S. PATENT DOCUMENTS 3,629,982 A * 12/1971 Ballay .................. E04B 1/3444
    135/115
3,984,949 A * 10/1976 Wahlquist ............. E04B 1/3445
    52/70

(Continued)

FOREIGN PATENT DOCUMENTS

| CN | 202248971 U | 5/2012 |
| CN | 204098537 U | 1/2015 |
| WO | 97/038188 | 10/1997 |

*Primary Examiner* — James A Shriver, II
*Assistant Examiner* — James J Triggs
(74) *Attorney, Agent, or Firm* — Oblon, McClelland, Maier & Neustadt, L.L.P.

(57) ABSTRACT

An expandable structure that includes front and rear structural units having inside-facing surfaces parallel to one another, a retractable top that spans the front and rear structural units, and first and second retractable partitions each of which spans and connects the front and rear structural units. The front structural unit is fixably attached to a substrate and the rear structural unit is mounted on a rolling mechanism so that the rear structural unit may be moved away from the front structural unit in an orientation perpendicular to the face of the first structural unit to a distance equivalent to a deployed depth of the first retractable partition, the second retractable partition and the retractable top.

10 Claims, 14 Drawing Sheets

(51) Int. Cl.

| | |
|---|---|
| *A47F 5/10* | (2006.01) |
| *B62B 3/02* | (2006.01) |
| *B62B 5/00* | (2006.01) |
| *E04H 15/40* | (2006.01) |
| *E04H 15/54* | (2006.01) |
| *E04H 15/56* | (2006.01) |
| *A47F 10/00* | (2006.01) |
| *A47F 11/02* | (2006.01) |
| *B62B 3/00* | (2006.01) |
| *E04B 1/343* | (2006.01) |
| *E04F 10/02* | (2006.01) |
| *A47F 9/00* | (2006.01) |
| *A47B 31/00* | (2006.01) |
| *E04B 1/32* | (2006.01) |
| *E04B 1/00* | (2006.01) |

(52) U.S. Cl.
CPC .............. *A47F 11/02* (2013.01); *B62B 3/005* (2013.01); *B62B 3/02* (2013.01); *B62B 5/0013* (2013.01); *E04B 1/34352* (2013.01); *E04B 1/34363* (2013.01); *E04F 10/02* (2013.01); *E04H 1/1222* (2013.01); *E04H 15/40* (2013.01); *E04H 15/54* (2013.01); *E04H 15/56* (2013.01); *A47B 2031/002* (2013.01); *A47B 2031/003* (2013.01); *A47B 2031/008* (2013.01); *E04B 1/3205* (2013.01); *E04B 2001/0061* (2013.01); *E04B 2001/327* (2013.01)

(56) References Cited

U.S. PATENT DOCUMENTS

| | | | |
|---|---|---|---|
| 9,022,414 B2* | 5/2015 | Bell | ........................ B62B 3/002 186/57 |
| 2014/0052463 A1 | 2/2014 | Cashman et al. | |
| 2014/0300087 A1 | 10/2014 | Bell | |
| 2017/0042325 A1 | 2/2017 | Tulli et al. | |

* cited by examiner

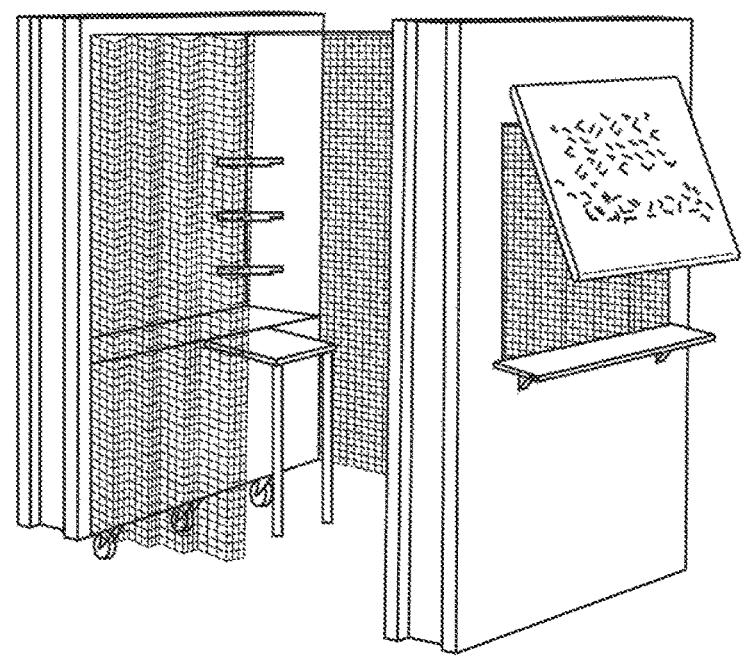
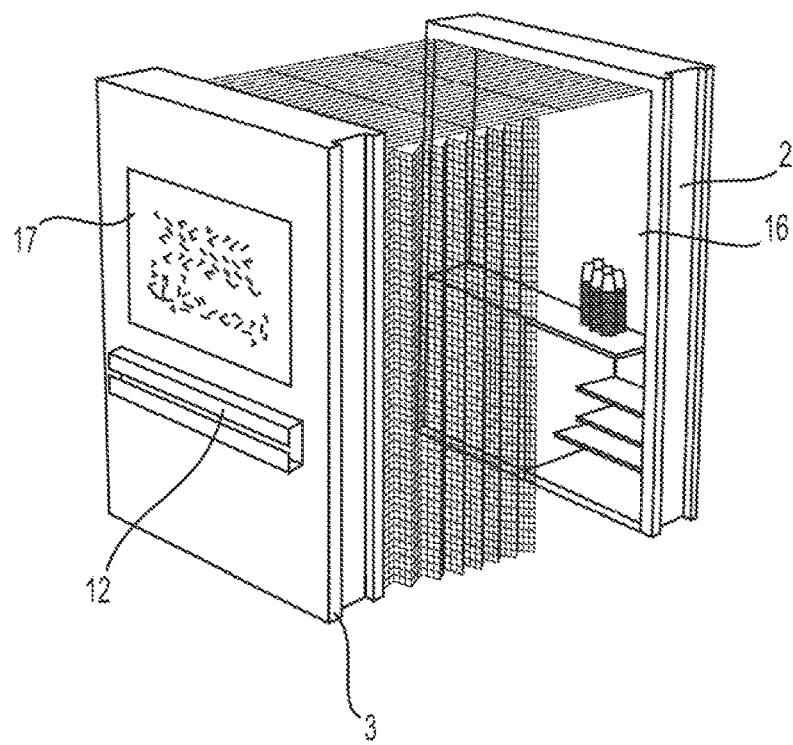
FIG. 5

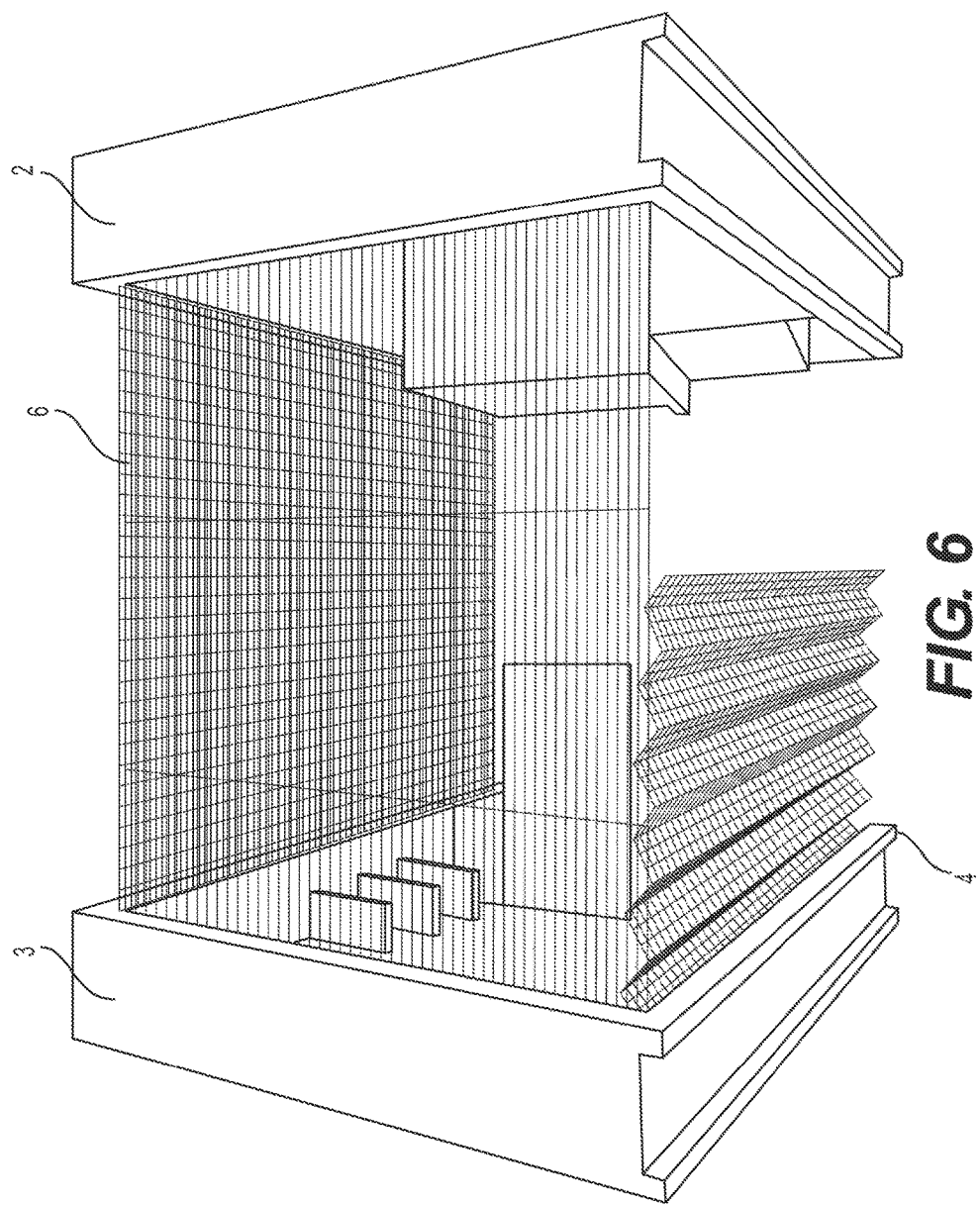

:

EXPANDABLE STRUCTURE AND VENDOR SPACE

CROSS-REFERENCE TO RELATED APPLICATIONS

The present application claims priority to U.S. Provisional Application No. 62/474,144, having a filing date of Mar. 21, 2017, incorporated herein by reference in its entirety.

BACKGROUND OF THE INVENTION

Field of the Invention

The present disclosure relates to an expandable structure that is partially anchored and expandable to increase interior space and thereby form a vendor space for the sale of food items and/or other products or services.

Description of the Related Art

Vendor spaces or kiosks that are located in outdoor locations and/or in unsecured areas are conventionally constructed with fixed walls and a fixed covering (ceiling) to provide a semi-enclosed work space. The advantages of such structures include security, protection from the elements, and projecting an image of permanence and professionalism. In addition such structures benefit from the association with a particular location. Permanent retail or service distribution structures have been widely used throughout the world. Experience has shown, however, that such structures suffer from several significant drawbacks.

In congested urban areas or areas where real estate and physical space is limited, permanent structures may occupy a significant amount of valuable real estate. Permanent structures occupy this real estate on a 24 hour basis even at times when the structure is not open or actively engaged in business. This drawback is associated with all retail locations that have regular opening and closing times.

The problems related to permanent occupancy of real estate are especially acute in public areas where political, governmental or sociological factors disfavor reserving space for private business enterprises. In order to counter these effects, some vendors have utilized mobile vendor devices such as food carts that can be easily moved to different locations and do not permanently occupy real estate in public areas. Mobile vendor devices such as food carts and "pop up" retail outlets are disadvantaged by the costs associated with making such retail sales points mobile or movable. Additionally, such mobile vendor devices, movable retail vendor store fronts, "pop ups" and/or vending points are typically small and accommodate only a single employee or retail representative. These drawbacks limit the productivity and customer service capability of conventional mobile vendor structures, mobile vendor devices and "pop ups" sales points.

SUMMARY OF THE INVENTION

In one aspect the present disclosure relates to an expandable structure that is at least partially permanently fixed in place and which is expandable to increase an interior work space. The expandable structure provides or mimics an interior space of a typical retail or vendor structure but advantageously saves space with the ability to collapse or retract into a smaller footprint.

In another aspect of the invention the structure contains only two hard sides.

Another aspect of the present disclosure relates to an expandable structure that includes a front structural unit and a rear structural unit with inside-facing surfaces parallel to one another, a retractable top, first and second retractable partitions such that the front structural unit is fixably attached to a substrate and the rear structural unit is mounted on a rolling mechanism so that the rear structural unit may be moved away from the front structural unit in an orientation perpendicular to the face of the first structural unit to a distance equivalent to a deployed depth of the first retractable partition, the second retractable partition and the retractable top.

In another embodiment the expandable structure has retractable partitions that are foldably retractable.

In another embodiment the front structural unit includes a utility supply line that provides electricity or water to the interior of the expandable structure.

In another embodiment the at least one of the front and rear structural units has one or more shelves mourned on an inside-facing surface.

In another embodiment the rolling mechanism includes wheels that rotate in axial alignment with the inside-facing surfaces of the front and rear structural units.

In another embodiment at least one of the first and the second retractable partitions has a passageway permitting ingress and egress to the interior of the expandable structure.

Another aspect of the invention relates to an expandable structure system that includes the expandable structure and an anchoring mechanism configured to hold the rolling mechanism of the rear structural unit.

In another embodiment the expandable structure system includes an anchoring mechanism that is configured to hold the rolling mechanism of the rear structural unit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 shows an aspect of the disclosure from a high level rear view perspective of a structure in an expanded configuration.

FIG. 6 shows a top view perspective of an aspect of the disclosure demonstrating a screen-type top cover and a screen-type side wall.

DETAILED DESCRIPTION OF THE PREFERRED EMBODIMENTS

Figure 1:
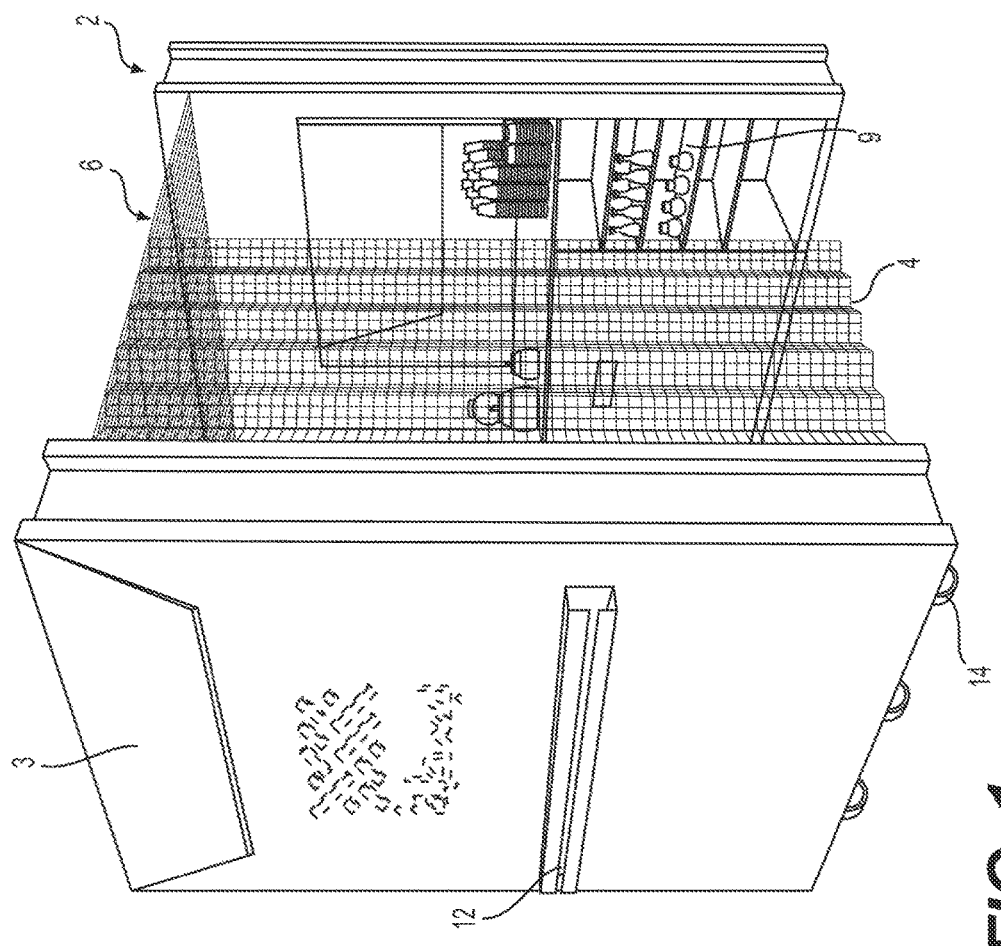
FIG. 1 shows a street-level perspective of an aspect of the disclosure as a rear view.

Aspects and embodiments of the present disclosure will now be described more fully with reference to the accompanying drawings, in which some, but not all of the embodiments of the disclosure are shown. In addition, the present disclosure will be understood with reference to the following definitions.

As used herein, the words "a" and "an" and the like carry the meaning of "one or more". With the description of this disclosure, where a numerical limit or range is stated, the end points are included unless stated otherwise. Also, all values and sub-values including subranges within a numerical limit or range are specifically included as explicitly written out.

The term "comprising" is considered an open-ended term synonymous with terms such as including, containing or having and is used herein to describe aspects of the invention which may include additional components, functionality and/or structure. Terms such as "consisting essentially of" are used to identify aspects of the invention which exclude particular components that are not explicitly recited in the claim but would otherwise have a material effect on the basic and novel properties of the disclosure. Basic and novel properties of the present disclosure include the collapsibility of an expandable structure, suitability of the expandable structure as a vendor space, suitability of the expandable structure to provide a secure space for conducting retail business with the public. The term "consisting of" describes aspects of the invention in which only those features explicitly recited in the claims are included and thus other components not explicitly or inherently included in the claim are excluded.

A preferred embodiment of the invention includes an expandable structure that functions to provide a vendor facility, retail location, pop-up store, serving point, meeting space, dissemination space or interaction point between two or more individuals. Preferably the expandable structure functions as a semi-permanent or temporary storefront for a vendor and preparer of articles such as food service items.

A preferred functionality of the expandable structure relates to providing a formal structure or interaction point for a vendor (herein the term "vendor" can refer to an individual in a retail service capacity or public service capacity) and an individual seeking to make a purchase from the vendor or obtain services from the vendor. Although the expandable structure is preferably used in an area that experiences periodic or irregular visitation, and is preferably in an outdoor setting, it may likewise be used in an indoor setting and/or in a setting, such as a shopping mall, where visitation and exposure to the public or to a group of potential customers is regular and/or predictable.

The terms "kiosk" and "expandable structure" are used herein to describe a structure which functions as a temporary or semi-permanent storefront that can readily accommodate one or more individuals in a retail or vendor-type function and/or to provide services and/or sales to the general public or to any other group of individuals. In a preferred embodiment of the present expandable structure a vendor is fully enclosed by the structure, fully covered by the structure and/or otherwise within particular perimeter or defined interior space of the expandable structure. Preferably at least two individuals are involved in a retail transaction involving the expandable structure, i.e., a vendor and a buyer (customer). A vendor is generally located within the expandable kiosk structure and a buyer (customer) is generally located in front of the vendor and in front of the expandable structure.

The expandable structure is "temporary" in that it may be expanded and collapsed to mimic the "opening" and "closing" of a typical conventional retail establishment. The expandable structure is "open for business" when it is in a fully expanded or deployed configuration and "closed for business" when it is in a retracted, collapsed or closed configuration.

In addition to providing a retail and/or temporary retail functionality, the expandable structure may additionally function to provide a display space and/or advertising space on one or more exterior surfaces. The display spaces may include conventional hard surface displays or variable displays with moving pictures such as an LED or other similar device.

Figure 8:
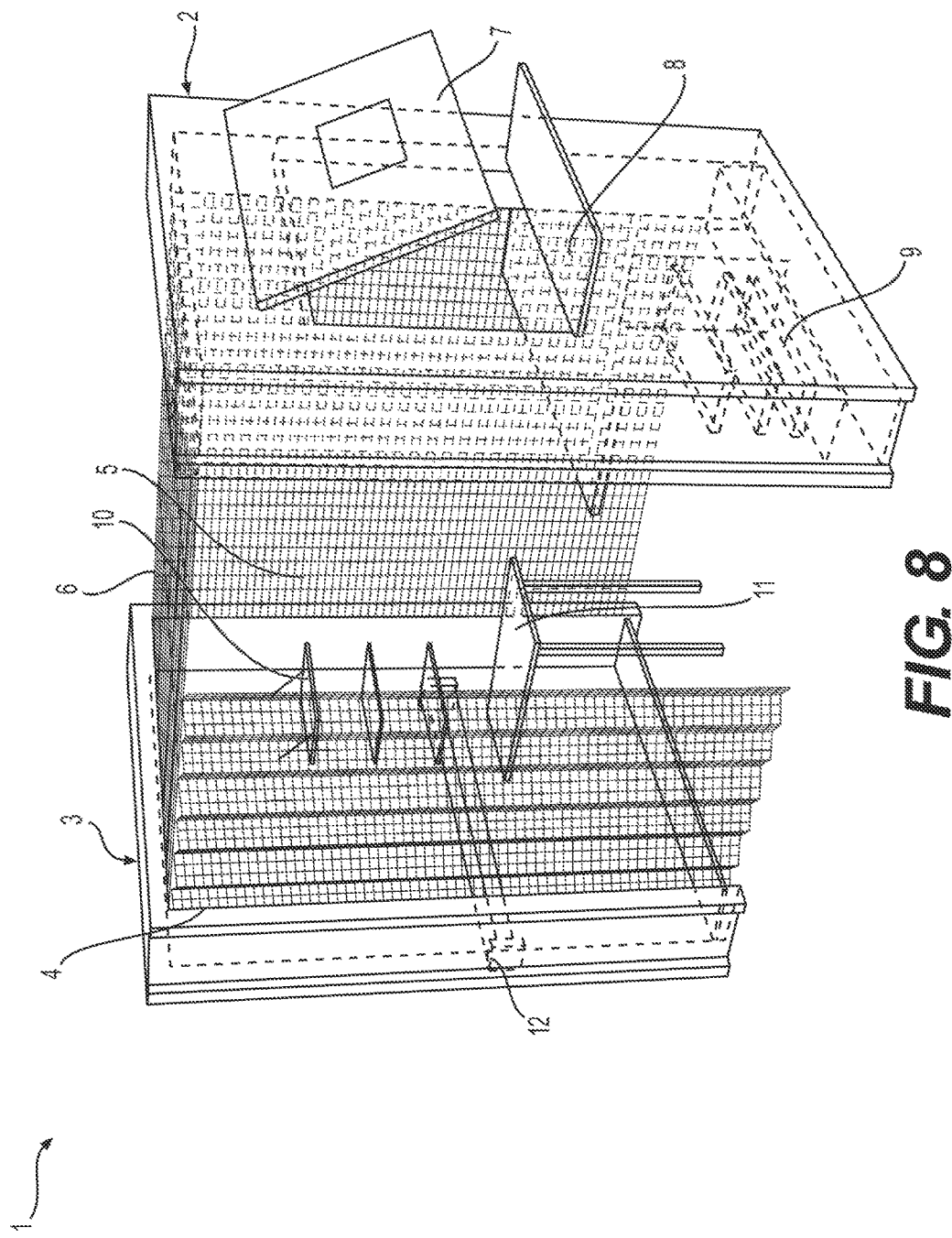
FIG. 8 shows a structure of the present disclosure in a fully expanded or deployed state with fixtures.

FIG. 8 shows a preferred embodiment of the present disclosure. The expandable structure 1 includes a front structural unit 2 and rear structural unit 3. The front and rear structural units 2 and 3 are connected by a foldable, retractable or removable shade or partition on a first side 4, a second side 5 and at the top 6. The expandable structure includes a front shading element or awning 7 and a front shelf or counter space 8 that protrudes from the outside surface of the structural unit 2.

The interior space defined by the inside-facing surfaces of the front structural unit 2, the rear structural unit 3, the first foldable partition 4, the second foldable partition 5, and the foldable top 6 may be equipped with a variety of structural features for convenience. For example, the front structural unit 2 may include one or more recesses on an inside-facing surface to hold shelves 9. Likewise, the rear structural unit 3 may include a series of shelves or workspaces connected to the inside surface of the rear structural unit 3. The outside face of the rear structural unit 3 may be equipped with a grip handle 12.

In another embodiment of the invention the expandable structure includes a first foldable partition 4 that completely covers the gap between the front structural unit and the rear structural unit 3. The rear structural unit 3 may be equipped with a passageway to permit entry and egress from the interior space of the expandable structure. The passage may be delimited by a screen similar to the foldable partition used for the first and second foldable partitions 4 and 5 or may be more similar to a conventional doorway with a locking handle.

In a preferred embodiment the rear structural unit 3 forms a single unbroken solid surface that is closed. In other embodiments of the invention the rear structural unit 3 may have one or more openings to permit passage of goods and utility service into the interior of the expandable structure. For example, the rear structural unit 3 may include an awning or sun shade similar to that which is mounted on the front structural unit 2. Likewise one or more outwardly-facing or inwardly-oriented shelves similar to the front shelf or counter space 8 which is hingeably affixed to the front structural unit 2 may be present on an inside or outside face of the rear structural unit 3.

Figure 9A:
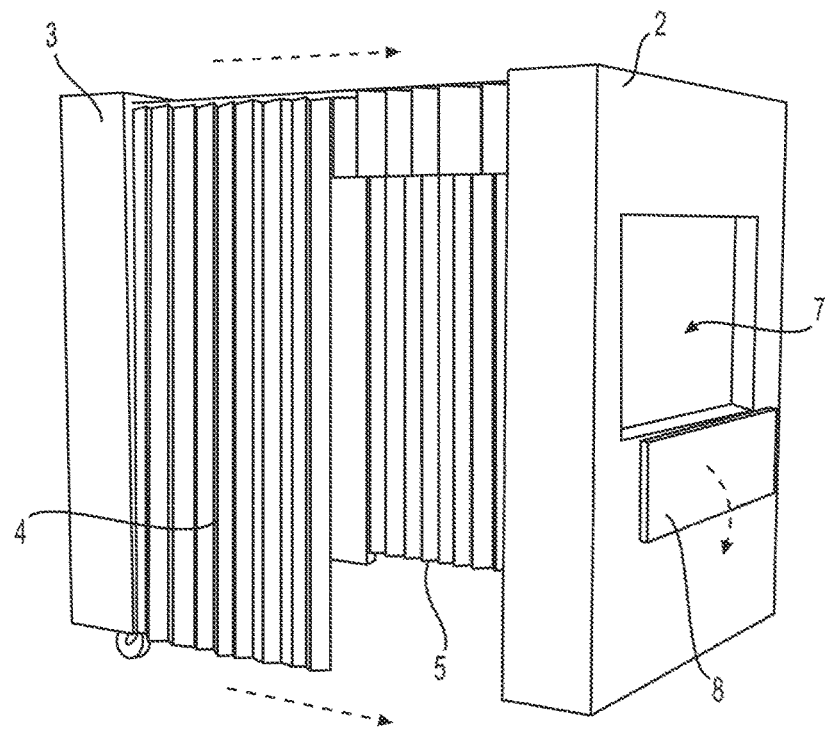
FIG. 9A shows a simple perspective of an aspect of the present disclosure in which the structure is in an open or fully deployed configuration but for stowage of a shelf or display unit from a street level view.

FIGS. 9A-F describe an operating functionality of the expandable structure. FIG. 9A shows the expandable structure 1 in a fully deployed form except for retraction of the shade or awning 7 and collapsing or folding down of the counter space 8. Otherwise, the first and second folding partitions 2 and 3 and the folding roof partition 5 are in their fully expanded and deployed positions. FIG. 9A shows the first step in retracting, collapsing or closing the expandable structure. For example, first the awning 7 and/or the counter or shelf 8 are collapsed or retracted to close an opening that is ordinarily intended for interaction with a customer.

The shelf of counter space 8 which is on the front surface or outside-facing surface of the front structural unit 2 is preferably hingeably or pivotally attached to the first structural unit 2. In order to fold away the shelf or counter 8 it preferably has an edge that is directly connected to the outside surface of the first structural unit 2 such that when it is in a folded or collapsed position the bottom surface of the shelf or counter 8 is in direct contact with the outside surface of the front structural unit 2. In other embodiments, in order to provide greater stability and support for the counter or shelf 8, it is mounted on one or more extensions which protrude from the outside surface of the front structural unit 2. This permits a greater amount of load carrying capacity on the counter or shelf 8. On the other hand, such supports may limit the ability of the shelf or counter 8 to lie flat against the outside surface of the front structural unit 2 when in a collapsed or retracted position. Preferably the shelf or counter space 8 is at least partially supported by one or more protrusions or shelf supports connected to the outside surface of the front structural unit 2.

Figure 9B:
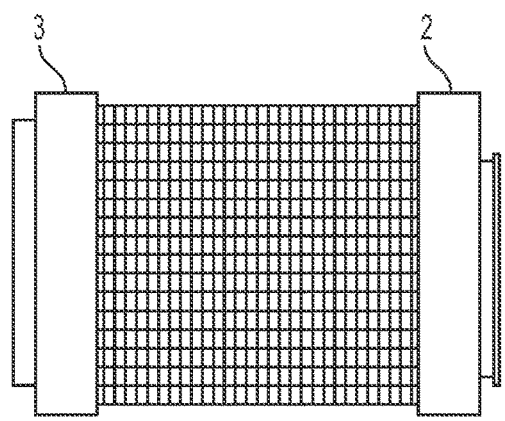
FIG. 9B shows a simple perspective of an aspect of the present disclosure in which the structure is in an open or fully deployed configuration but for stowage of a shelf or display unit from a top view.

The second step in closing or collapsing the expandable structure includes pushing the rear structural unit 3 forward to the front structural unit 2. The second step in closing or collapsing the expandable structure includes pushing the rear structural unit 3 forward to the front structural unit 2. FIG. 9B shows a top view of the expandable structure in its fully expanded or deployed form but for retraction or collapse of the awning or shade 7 and the counter or shelf space 8. In the top view shown in FIG. 9B the front and rear structural units 2 and 3 are in their furthermost positions away from one another. The front and rear structural units 2 and 3 remain connected, however, through the foldable partitions representing the sides and the top of the expandable structure in its expanded form.

Figure 9C:
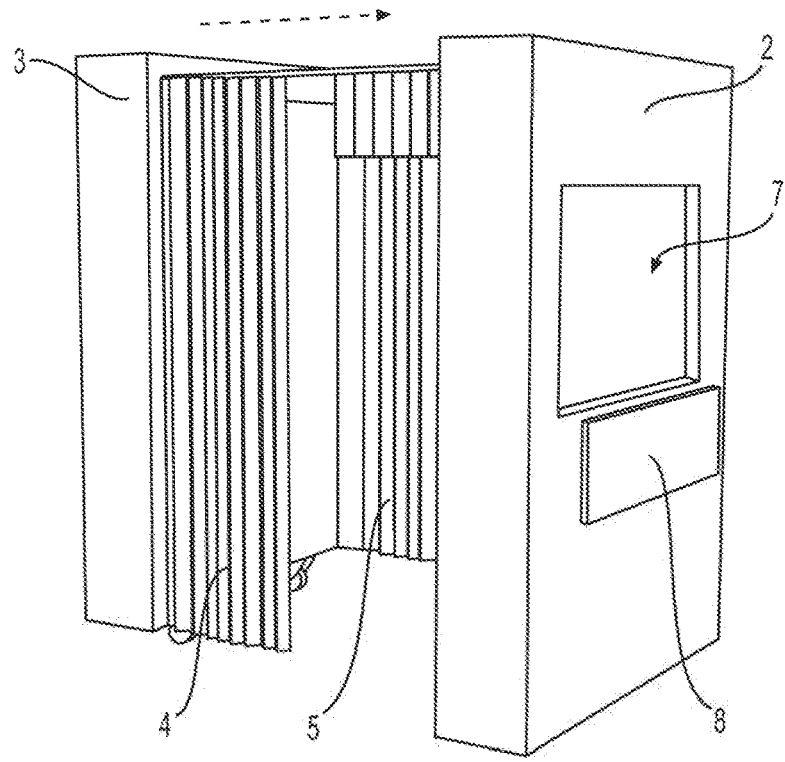
FIG. 9C shows a simple perspective of a structure within the present disclosure that is undergoing collapsing or storage for closing from a street view.

FIG. 9C shows the expandable kiosk structure in a partially collapsed or partially closed form. The space defined by the front structural unit, the rear structural unit and the partitions 4, 5 and 6 is now decreased in both aerial and volumetric space. The front-facing surface of the front structural unit 2 is in a closed configuration such that the countertop 8 is in a retracted or collapsed form and the shading or awning 7 completely covers or blocks a customer service window.

Figure 9D:
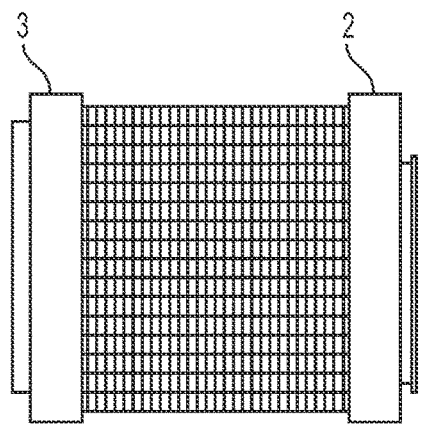
FIG. 9D shows a top view of a simple perspective of a structure within the present disclosure that is undergoing collapsing or storage for closing.

FIG. 9D shows a top view of the expandable structure in a partially collapsed form. As the rear structural unit 3 is moved towards the front structural unit 2 the overall depth of the expandable structure unit changes in an accordion-like fashion. In its partial retraction or collapse shown in FIG. 9D, the outside profile from the top view does not change substantially but for the accordion-like collapse of a center portion which represents the foldable partitions 4, 5 and 6.

Figure 9E:
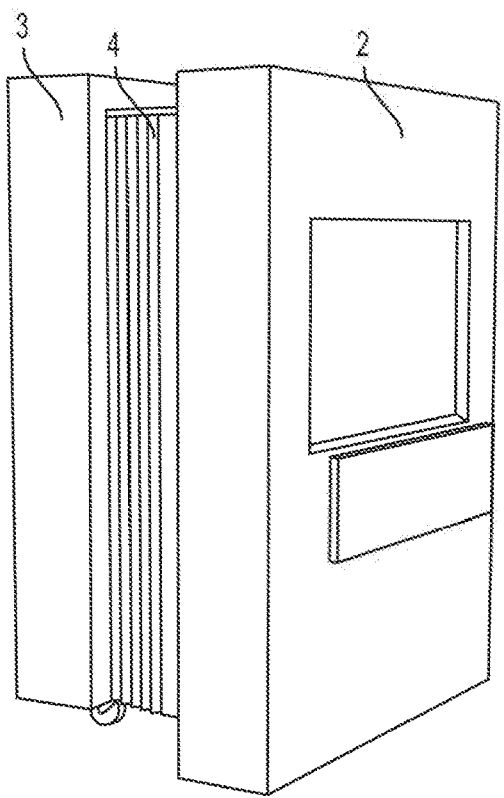
FIG. 9E shows a simple perspective of an aspect of the present disclosure in which a structure is in its fully closed, collapsed or stowed form including exterior elements such as a shelf.

FIG. 9E shows a side-view perspective of the expandable structure in its fully collapsed or closed form. The rear structural unit 3 is pushed fully towards the rear face of the front structural unit 2 such that no more forward movement of the rear structural unit 3 is possible. As a consequence, the foldable partitions 4, 5 and 6 are in a collapsed and condensed form.

Figure 9F:
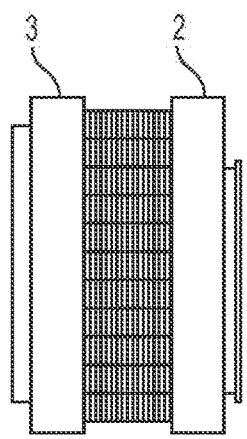
FIG. 9F shows a top view perspective of an aspect of the present disclosure in which a structure is in its folly closed, collapsed or stowed form including exterior elements.

FIG. 9F shows a top view of the expandable structure in a fully collapsed or retracted configuration. The foldable partitions 4, 5 and 6 are now in a fully folded or retracted position and lie collapsed between the rear structural unit 3 and the front structural unit 2. In their collapsed condition the foldable partitions form an essentially solid outwardly-facing surface to prevent the ingress of insects and vermin around the outside-facing and upwardly-facing sides of the expandable structure.

In its fully collapsed form the expandable structure may be locked or secured in place to prevent unauthorized or accidental deployment or expansion of the collapsed structure. Such security or anchoring devices may be located around the perimeter of the first and second structural units 2 and 3 and may consist of conventional locking devices or other physical means by which the front and rear structural units are held in place in close proximity.

Figure 10:
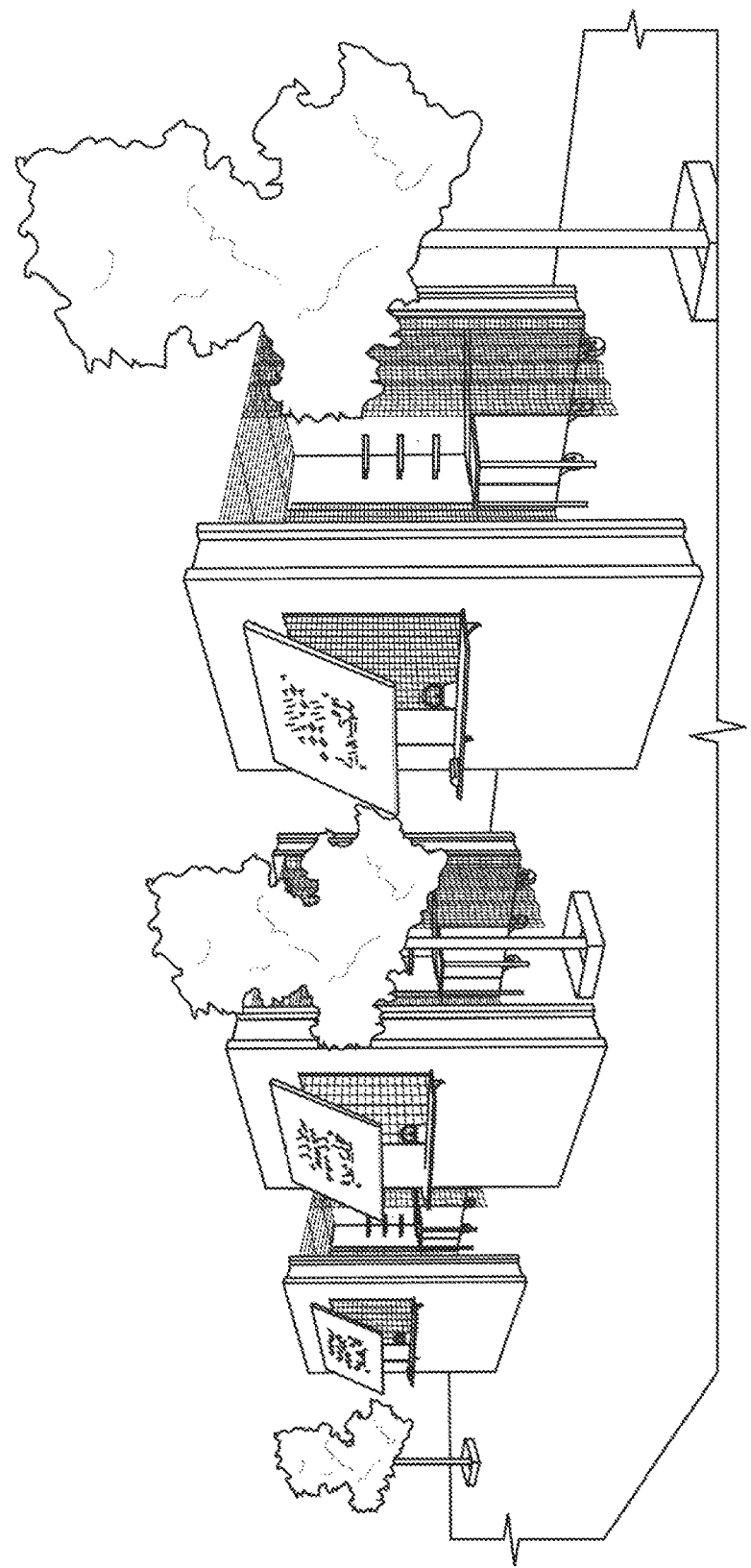
FIG. 10 shows an aspect of the disclosure in which a plurality of structures is deployed in an expanded or open configuration in a public space.

FIG. 10 shows a depiction of an embodiment of the invention in which a plurality of expandable structures is installed in an outdoor public beachfront area. The expandable structures provide opportunities for members of the public or individuals visiting the area to obtain services, information, retail goods and food. Typically the expandable structure is installed so that the front structural unit 2 has an outward surface that faces the direction of convergence of individuals or crowds moving along the public space. The shade or awning 7 may display a logo or advertisement to attract customers and inform individuals of the purpose of the expandable structure. Likewise, the shelf 8 may act as a display area on which food, goods and products may be displayed to attract customers.

FIG. 10 shows an important aspect of the configuration of the expandable structure. The front structural unit 2 is fixably attached to a substrate such as the boardwalk surface. In this respect the front structural unit 2 acts as the storefront face of the expandable structure. The rear structural unit 3 on the other hand is a mobile portion of the expandable structure which is not permanently or fixably attached to a substrate such as the concrete or paving stone surface of the boardwalk shown in FIG. 10.

Figure 2:
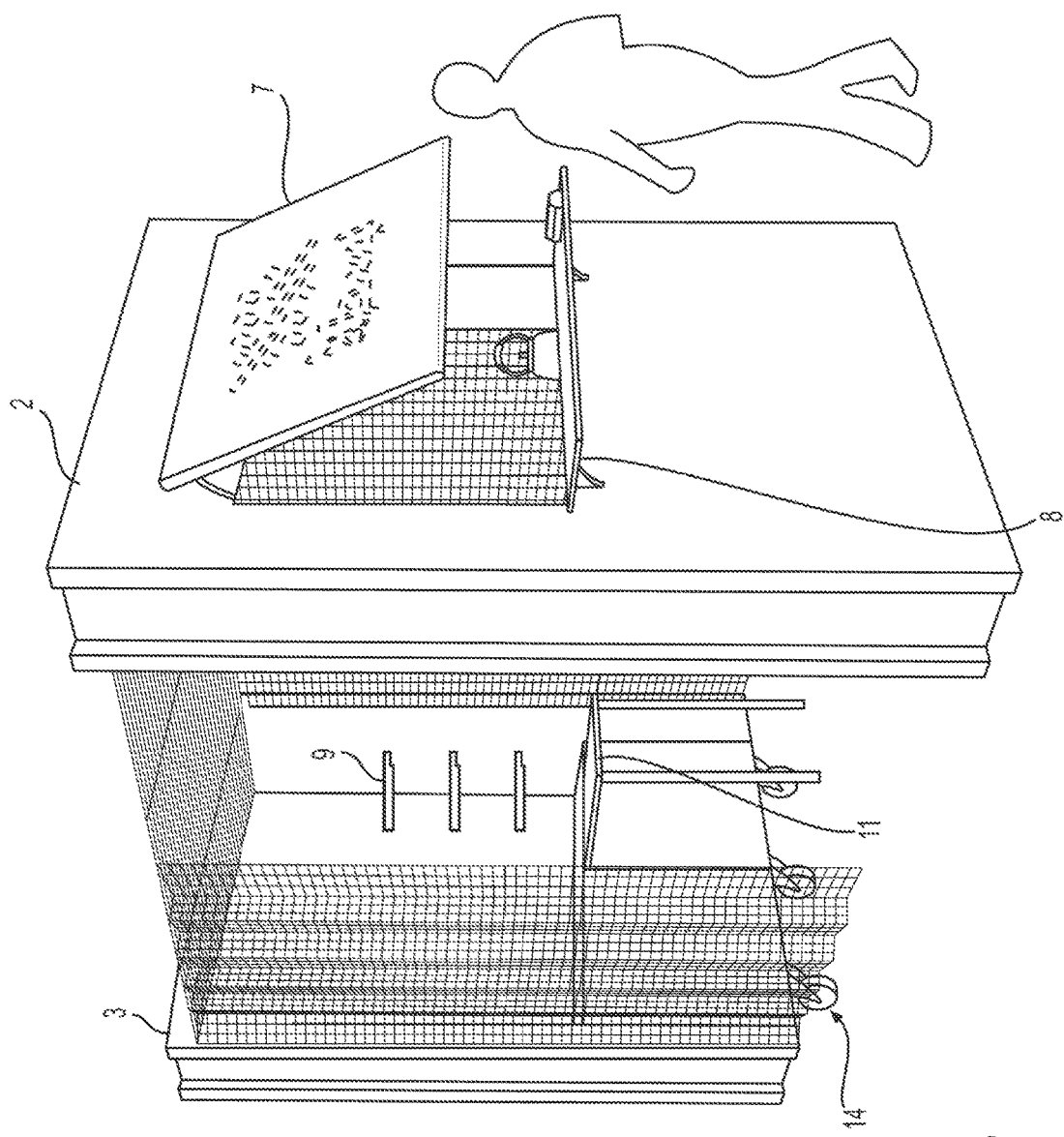
FIG. 2 shows a street-level perspective of an aspect of the present disclosure from a front view.

FIGS. 1 and 2 show street-level perspectives of the expandable structure. FIG. 1 shows a street-level perspective from the rear of the expandable structure. The rear structural unit 3 is shown with a grip or push bar 12 to aid a user in moving the rear structural unit 3 forward towards the front structural unit 2 to close or retract the structure. In the interior space of the expandable kiosk structure shelves 9 can be seen mounted on the interior surface of the front structural unit. The first foldable partition 4 includes a first section that extends from the ceiling almost to ground level. A second section is truncated and starts at or near the ceiling but extends downwardly only to about head height for a human thus forming a doorway or passageway through the first foldable partition 4. Preferably the expandable structure includes only a single passageway through the first foldable partition or the second foldable partition 5.

FIGS. 1 and 2 also show a rolling or friction reducing device 14 mounted at the bottom of the rear structural unit 3. The purpose of this device is to aid in retraction or closing of the expandable structure whereby the rear structural unit 3 is moved forward towards the front structural unit 2.

The embodiments shown in FIGS. 1 and 2 describe three wheels or casters that roll upon a surface on which the expandable structure is installed. However, more or fewer wheels or casters may be used and/or other friction reducing devices or rollers can be used in place of the particular casters or wheels shown in FIGS. 1 and 2. For example, the plurality of wheels shown in FIGS. 1 and 2 may be replaced by a single long rolling mechanism having a width substantially greater than height. The advantage of a single rolling mechanism is a reduction in twisting during closing or at times when the rear structural unit 3 is pushed towards or away from the front structural unit 2. In other embodiments of the invention the wheels, casters or rolling mechanism on the rear structural unit 3 may fit into one or more rails or recesses formed into a substrate on which the expandable kiosk structure is fixed, mounted or anchored. Rails, recesses or other guiding mechanisms can function to reduce twisting and misalignment of the front and rear structural components (2 and 3) during opening and closing of the expandable structure.

FIG. 1 shows the interior of the expandable structure with shelves 9 installed. More or fewer shells may be included either on the front structural unit 2 or rear structural unit 3, preferably on inside-facing surfaces, or on other surfaces of the expandable structure. The precise configuration of shelves and/or storage devices and/or utility devices may be customized according to the functionality that is desired by a user. For example, the interior space of the expandable kiosk structure may be equipped with one or more mechanical devices such as a refrigerator, heater or water storage unit. Other devices include cooking elements such as ovens, microwaves, espresso machines and the like.

FIG. 2 shows a street-level perspective of the expandable structure from the perspective of an individual approaching the structure for service or purchase. The shading or awning 7 includes a logo or other attractive display. The awning or shading is set at a level that permits an individual to view the interior space of the expandable structure and interact with one or more individuals acting in a retail capacity inside the interior of the expandable structure. The interior space of the expandable structure shows that the rear structural unit 3 may include shelves mounted on an inside-facing surface. As for the shelves or devices that may be positioned or installed on the front structural unit 2, the rear structural unit 3 accommodates any configuration or arrangement of shelves, storage units or devices for cooking, storage, food preparation and the like. In the particular embodiment described in FIG. 2, the rear structural unit 3 includes a foldable or collapsible tabletop surface 11. The surface 11 may be pivotally or hingeably attached to the inside-facing surface of the structural unit 3 so that it may be deployed or expanded in a downward position when needed. When the expandable structure is closed for business and/or otherwise retracted or pushed closed, the tabletop surface 11 may be rotated or folded upwardly or downwardly such that it is placed in to a retracted and collapsed position permitting full closure of the expandable structure.

Figure 3:
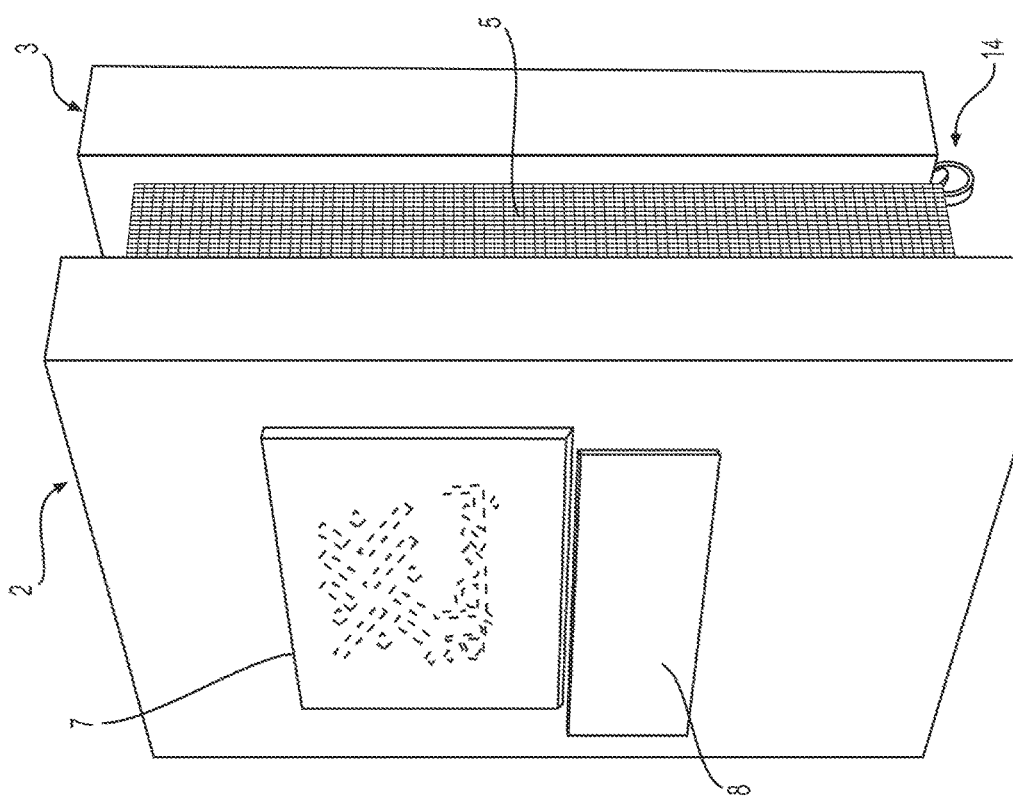
FIG. 3 shows a street-level front view perspective of an aspect of the present disclosure in a stowed or collapsed configuration.

FIG. 3 shows a street-level perspective of the expandable kiosk structure in its fully collapsed or closed form. The shade or awning 7 preferably completely covers or alternately partially obstructs access into the interior of the expandable structure. The shelf 8 is in a closed or stowed position thus no longer protruding substantially from the front-facing surface of the front structural unit 2. The rear structural unit 3 is in its closest proximity to the front structural unit 2. The foldable screen 5 is fully folded or retracted and is no longer compressible. The rolling mechanism 14 may be placed in a braked or locked position to resist movement away from the front structural unit. Although not shown in FIG. 3, in its fully retractable and closed position the expandable structure may be locked or secured to prevent access. Locking may be integral to the unit such that expansion is resisted or stopped by control of the deployment or unfolding of the foldable partition 5, 4 or 6 or by a front connection in which the rear structural unit 3 is held in place or anchored to the front structural unit 2. Other locking mechanisms may include resistance to rolling at the point where the castor or wheel 14 is in contact with a substrate or hard surface. The locking mechanism is not otherwise limited and may include locking or binding at multiple points and locations on the structure of the expandable structure.

Figure 4:
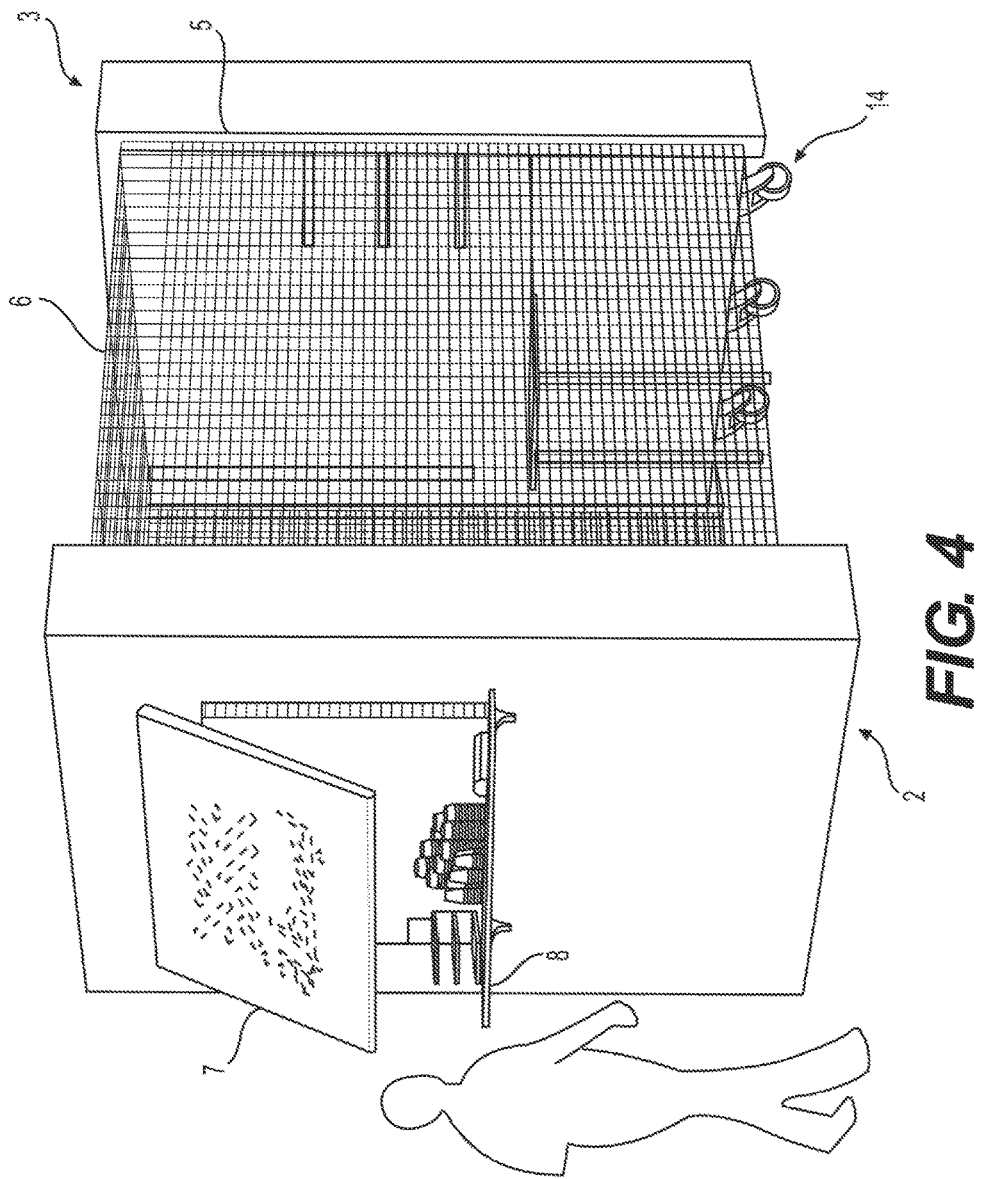
FIG. 4 shows a street-level perspective of an aspect of the present disclosure in an expanded configuration from a front view.

FIG. 4 shows a street-level front facing perspective of the expandable structure. In contrast to the closed or retracted position described in FIG. 3, the open and functional position described in FIG. 4 includes a shade or awning 7 that is in an expanded or lifted position that no longer blocks access and/or passage of items through the front structural unit 2 to the interior of the expandable structure. The shade or awning 7 may take many positions, not only the position described in FIG. 4. For example, the awning may be installed on rails permitting its positioning vertically or laterally along the height or width of the rear structural unit 3. Such positioning may allow for better adjustment for shading or blockage front view. The shade or awning 7 may also be adjusted angularly with respect to the angle between the awning and the front face of the front structural unit 2. The angle of the awning or shading 7 relative to the front face of the front structural unit may be adjusted from angle of 90° at which the awning or shading 7 is perpendicular to the front face of the front structural unit 2, to an oblique angle where the shading or awning is close to the surface of the front structural unit. Close positioning of the shading or awning may help in excluding the elements such as rain or hail during periods of inclement weather. The shade or awning preferably has dimensions that completely cover the access window of the front structural unit 2. The shade or awning 7 can therefore be positioned to completely cover the access window to prohibit entry or ingress of the elements or vermin.

The exterior shelf 8 is preferably in a deployed position to hold one or more items offered for sale or display. The shelf 8 provides a convenient platform on which to conduct business and exchange goods and/or services for consideration.

In the configuration shown in FIG. 4 the foldable partition 5 provides shading and/or a security screen for the entire length between the front structural unit and the rear structural unit 3. In other embodiments of the invention the second foldable partition 5 may have one or more passageways permitting passage of a person or articles. The ceiling or top of the expandable kiosk structure is likewise a foldable partition. In different embodiments the foldable partition 6 may provide complete coverage and blockage of the elements or may alternately be in screen form providing partial shading and/or security from unauthorized ingress. Preferably the foldable partition 6 provides a cover that blocks more than 50%, preferably 75%, more preferably 90% of sunlight thereby providing a shaded area inside the expandable kiosk structure for work and storage of goods.

FIG. 5 shows an alternate embodiment of the invention in which both the front structural unit and the rear structural unit 3 have an opening permitting interaction with a customer. The opening or access window 16 in the front structural unit may be covered with a shading or awning for security when the expandable structure is closed or retracted. The access window or opening 17 in the rear structural unit 3 may also be covered or shaded with an awning or security blockage (not shown) similar to that employed for the access window 16 in the front structural unit 2.

FIG. 5 shows a high level perspective view of the expandable structure showing the rear structural unit. The rear structural unit 3 is also subject to an access window 17. The access window can be the same size or larger than the opening in the front structural unit 2. In other embodiments the access window 17 includes a shade or awning similar to the shade or awning 7 that is present on the front structural unit 2. The opening or access point on the front structural unit 2 is shown as 16 in FIG. 5.

FIG. 6 shows a top view perspective of the expandable kiosk structure showing in particular the foldable partition 6 which is a ceiling or security barrier connecting the top portions of the front structural unit 2 and the rear structural unit 3. The foldable partition 6 may alternately be reliable such that it has a structure similar to the structure of shades deployed for window screening in ordinary household applications. Preferably the foldable partition 6 has a matching structure with the foldable partitions 4 and 5 to provide for easy collapsing and secure connections between the foldable partition 4 and 6 and the foldable partition 5 and 6. In the perspective view provided as FIG. 6 the foldable partition 6 serves mainly a security function and little if any shading function. The folding partition 6 is preferably directly connected with the folding partitions 4 and 5. In one embodiment the folding partitions 4 and 5 are connected to the folding partition 6 by hooks or a hanging mechanism. In this embodiment the folding partitions 4 and 5 may be separately opened and closed without movement of the first or second structural units 2 and 3. In another embodiment the foldable partitions 4 and 5 are permanently connected to the folding partition 6 such that folding of any one of folding partitions 4, 5 or 6 requires folding of one or more and preferably all of the folding partitions concurrently.

FIGS. 7A-E describe aspects of the expandable structure with relation to the height and dimensions of an ordinary human. Both the front and rear structural units are taller than a typical human and have a dimension of approximately 3 meters, preferably 2-3.5, or about 2.0-2.5 meters.

Figure 7B:
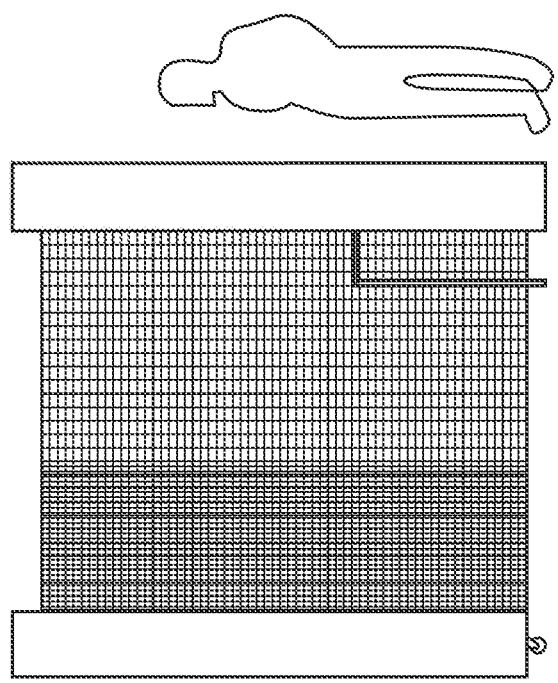
FIG. 7B shows a side view perspective of an aspect of the present disclosure with dimensions relating to an adult customer.
Figure 7A:
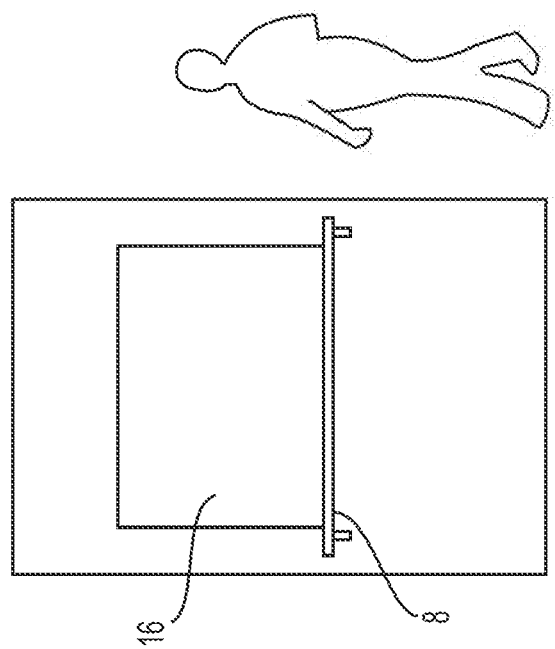
FIG. 7A shows a front elevation perspective of an aspect of the present disclosure providing a dimensional comparison with an adult customer.

FIG. 7A shows a front elevation of the expandable structure and the relation of the access window 16 to the position and approach of a potential customer. FIG. 7B compares the dimensions of the expanded expandable structure as a side view in relation to a customer. FIG. 7C shows a side view of the expandable structure in its collapsed or closed state again with respect to the perspective of a customer. The side view of FIG. 7C shows a customer facing the rear structural unit 3 and thus provides a comparison with the dimensions of the rearward surface of the expandable kiosk structure.

FIG. 7B shows a top diagrammatic perspective of the expandable kiosk structure. In this view a countertop or shelf 16 is connected or built in to the inside facing surface of the front structural unit 2.

The width of the expandable structure when in a collapsed form is from 0.5 to 2.5 meter, preferably from 1 to 1.5 meters and most preferably about 1.2 meters. In a fully expanded form the depth of the expandable structure is preferably 2-4 meters, preferably 2.5-3.5 meters, preferably about 3 meters or about 2.8 meters. The width of the front structural unit and rear structural unit is from 1 to 3 meters, preferably 1.5 to 2.5 meters or about 2 meters. The width of the expandable structure does not change on collapse or deployment because it is part of the fixed dimensions of the front-facing and rear-facing surfaces of the front structural unit and the rear structural unit, respectively. The height of the expandable structure likewise does not change upon expansion or contraction.

This shelving holds one or more mechanical devices or cooking devices or storage devices for holding goods or information for later distribution. The rear structural unit 3 is connected to a shelving unit or mechanical unit 17 that may be permanently installed or pivotally or hingeably installed permitting retraction. The retractable tabletop surface 11 is also shown. The work surface 11 is directly connected to the inside-facing surface of the rear structural unit 3 through a lengthwise hinge or pivot.

Figure 7D:
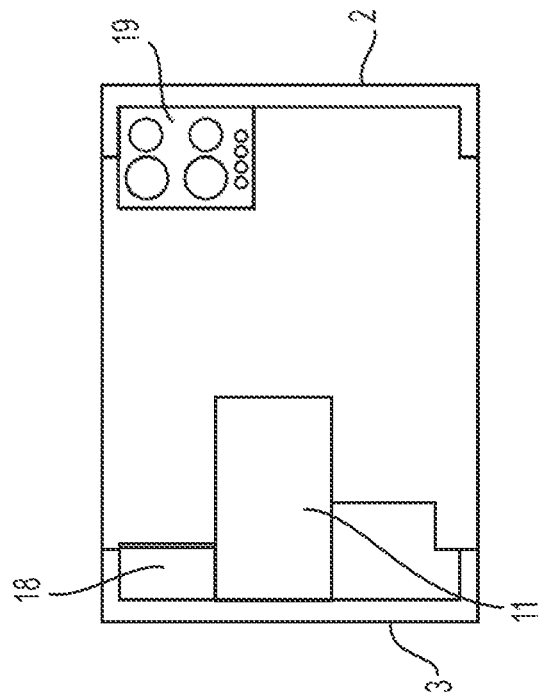
FIG. 7D shows a view from above of an aspect of the present disclosure in which a structure is in its open or deployed state.
Figure 7C:
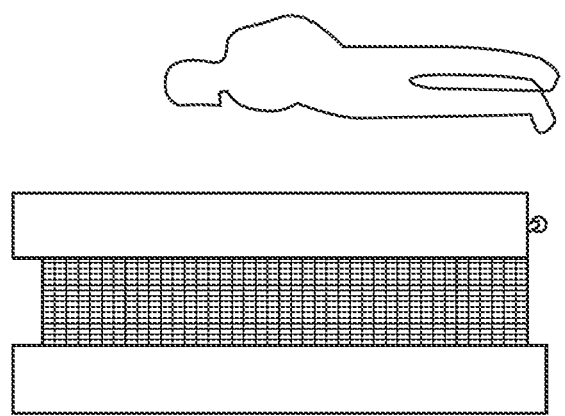
FIG. 7C shows a side view of an aspect of the present disclosure in which a structure is in its closed or collapsed position relative to the dimensions of an adult customer.
Figure 7F:
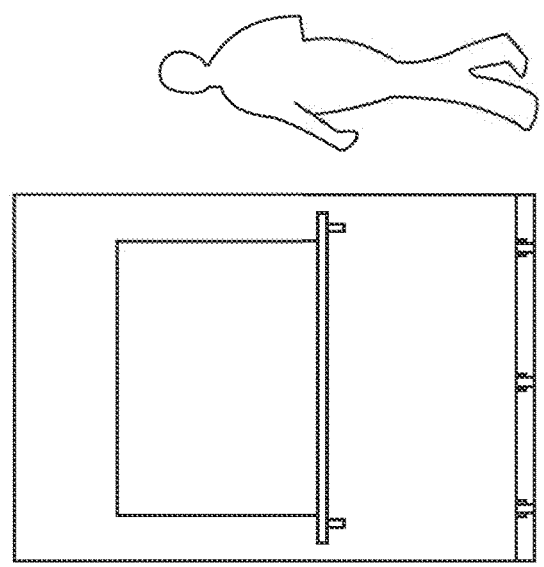
FIG. 7F shows an aspect of the present disclosure in a rear view relative to the dimensions of an adult customer.

FIG. 7D shows a stylized top view of the expandable structure in its fully expanded form. Internal features such as the work surface 11 are evident. In addition, features such as utility service 19 may be present. The utility service may include or contain electrical devices such as mixers, coffee makers and the like. Other utility features such as a sink or basin may be present. Preferably the utility devices 19 are connected through one or more utility conduits to an electrical supply, water supply or water drain that is routed through the front structural units 2. A further feature 18 may be mounted permanently or temporarily on the rear structural unit 18. In its position on the rear structural unit the utility device 18 preferably does not require hard wiring to any electrical or water source although a cooking device such as a propane stove may have a separate propane source which is at least temporarily affixed to the rear structural unit.

Figure 7E:
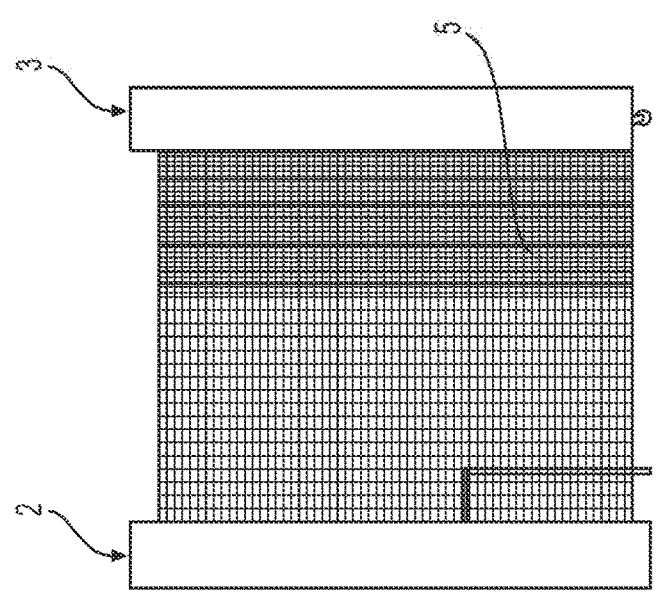
FIG. 7E shows an aspect of the present disclosure in a side view with a structure in its open or deployed position relative to the dimensions of an adult customer.

FIG. 7E provides a side view of the expandable kiosk structure in its fully expanded or deployed position. The foldable partition 5 spans the distance between the front structural unit 2 and the rear structural unit 3.

The invention claimed is:

1. An expandable vendor structure, comprising:
   a front structural unit and a rear structural unit, wherein the front and rear structural units have inside-facing surfaces parallel to one another,
   a retractable top that spans the front and rear structural units and is connected to front and rear structural units, wherein the retractable top is a rollable screen fixed to the tops of the front and rear structural units, first and second retractable partitions, each of which spans and connects the front and rear structural units, wherein the front structural unit is immobilized by fixation to a substrate and the rear structural unit is mounted on a rolling mechanism so that the rear structural unit moves away from the front structural unit in an orientation perpendicular to the face of the first structural unit to a distance equivalent to a deployed depth of the first retractable partition, the second retractable partition and the retractable top, an exposed shelf surface pivotally or hingeably attached to an outside-facing surface of the front structural unit.

2. The expandable vendor structure of claim 1, wherein the first and the second retractable partitions and the retractable top are foldably retractable.

3. The expandable vendor structure of claim 1, wherein the front structural unit includes a utility supply line that provides electricity or water to the interior of the expandable structure.

4. The expandable vendor structure of claim 1, wherein at least one of the front and rear structural units has one or more shelves mounted on an inside-facing surface.

5. The expandable vendor structure of claim 1, wherein the rolling mechanism includes wheels that rotate in axial alignment with the inside-facing surfaces of the front and rear structural units.

6. The expandable vendor structure of claim 1, wherein at least one of the first and the second retractable partitions has a passageway permitting ingress and egress to the interior of the expandable structure in an expanded configuration.

7. An expandable vendor structure system, comprising:
the expandable structure of claim 1, and
an anchoring mechanism configured to hold the rolling mechanism of the rear structural unit at a distance from the front structural unit corresponding to a fully expanded configuration of the expandable structure.

8. The expandable vendor structure system of claim 7, wherein the anchoring mechanism is configured to hold the rolling mechanism of the rear structural unit at a distance from the front structural component corresponding to a fully retracted configuration of the expandable structure.

9. The expandable vendor structure system of claim 7, wherein the inner surface of both the first and the second retractable partitions has a reversible snap fit locking to ensure the perfect closure and fully retracted configuration of the expandable structure.

10. The expandable vendor structure system of claim 7, further comprising:
a rail for holding a wheel or guiding mechanism of the rolling mechanism that moves between the inside-facing surface of the front structural unit and the inside-facing surface of the rear structural unit.

* * * * *